United States Patent
Johnson

(10) Patent No.: US 6,714,715 B2
(45) Date of Patent: Mar. 30, 2004

(54) OPTICAL DEVICE, SYSTEM AND METHOD FOR DETECTING A CONDITION IN AN OPTICAL DEVICE

(75) Inventor: Steven R. Johnson, Fair Haven, NJ (US)

(73) Assignee: TerraWorx, Inc., Shrewsbury, NJ (US)

( * ) Notice: Subject to any disclaimer, the term of this patent is extended or adjusted under 35 U.S.C. 154(b) by 94 days.

(21) Appl. No.: 09/953,754

(22) Filed: Sep. 17, 2001

(65) Prior Publication Data

US 2003/0052253 A1 Mar. 20, 2003

(51) Int. Cl.[7] .................................................. G02B 6/00
(52) U.S. Cl. ........................ 385/140; 385/14; 385/31; 385/39; 385/88; 385/24
(58) Field of Search ........................ 385/14, 31, 39, 385/88, 89, 92, 140, 24

(56) References Cited

U.S. PATENT DOCUMENTS

| | | | |
|---|---|---|---|
| 5,109,161 A | 4/1992 | Horiuchi et al. | 250/561 |
| 5,138,621 A | 8/1992 | Goto et al. | 472/38 |
| 5,406,368 A | 4/1995 | Horiuchi et al. | 356/73.1 |
| 5,535,039 A * | 7/1996 | Belcher et al. | 398/195 |
| 5,539,557 A | 7/1996 | Horiuchi et al. | 359/110 |
| 5,790,294 A | 8/1998 | Horiuchi et al. | 359/177 |
| 5,825,515 A | 10/1998 | Anderson | 359/110 |
| 5,898,502 A | 4/1999 | Horiuchi et al. | 356/416 |
| 6,160,649 A | 12/2000 | Horiuchi et al. | 359/110 |
| 6,175,436 B1 * | 1/2001 | Jackel | 359/349 |
| 6,185,020 B1 | 2/2001 | Horiuchi et al. | 359/110 |
| 6,201,599 B1 | 3/2001 | Ryu et al. | 356/73.1 |
| 6,301,272 B1 * | 10/2001 | Koch et al. | 372/6 |
| 6,501,594 B1 * | 12/2002 | Hwang et al. | 359/341.32 |

* cited by examiner

*Primary Examiner*—Brian Healy

(57) ABSTRACT

An optical device and system and method for monitoring a fault condition in an optical device. A loop-back path couples a portion of an optical signal from a first transmission path to a second transmission path as a loop-back signal. The loop-back path includes at least one optical attenuator configured to attenuate the loop-back signal in response to at least one detected condition. The loop-back signal may be detected by line monitoring equipment, where the attenuation imparted by the attenuator is interpreted as corresponding to the detected condition.

24 Claims, 3 Drawing Sheets

OPTICAL DEVICE, SYSTEM AND METHOD FOR DETECTING A CONDITION IN AN OPTICAL DEVICE

FIELD OF THE INVENTION

This invention relates in general to optical communication systems, and in particular to a system and method for detecting a condition in an optical device.

BACKGROUND OF THE INVENTION

Optical communication systems, in particular long-haul networks of lengths longer than 600 kilometers, inevitably suffer from signal attenuation due to a variety of factors including scattering, absorption, and bending. To compensate for losses, repeaters are typically placed at regular intervals along the optical transmission path. Each repeater boosts the input optical signal to compensate for accumulated transmission losses. Initially, this function was accomplished solely by regenerators, which convert optical signals into electrical form and then back to optical form in order to amplify, reshape, retime, and re-transmit the optical signal. The advent of reliable and low cost optical amplifiers has largely obviated the need to make such optical-electrical-optical conversions, although longer spans may still require such conversions depending on the amount of signal degradation.

Optical amplifiers include rare earth doped fibers such as erbium doped fiber amplifiers (EDFAs) and Raman amplifiers. An EDFA operates by passing an optical signal through an erbium-doped fiber segment, and "pumping" the segment with light from another source such as a laser. The pumping energy may be provided at 1480 nm or 980 nm for an EDFA, which corresponds with the absorption peaks of erbium. Raman amplification occurs throughout an optical transmission fiber when the transmission fiber is pumped at an appropriate wavelength or wavelengths. Gain is then achieved at a longer wavelength through the process of Stimulated Raman Scattering.

To measure the performance of repeaters containing optical amplifiers, optical communication systems may employ a line monitoring system (LMS). The line monitoring system may include line-monitoring equipment (LME) located in the terminal stations and loop-back paths in the repeaters and terminals. The loop-back paths (hereinafter loop-back paths) optically couple two fibers of a fiber pair (one in each direction of transmission) such that a portion of the optical signal originating at a transmitting terminal and being transmitted on one of the fibers of the pair is looped back and coupled into the fiber that is transmitting in the reverse direction back toward the transmitting terminal. The fundamental quantity measured by the LME is the round-trip loop gain between the LME and each terminal and repeater loop-back path on a fiber pair. Through routine analysis of the measured loop gains compared to a baseline loop gain at normal operating conditions, the LMS can be used to detect changes in the performance of the portion of the system spanned by the monitored repeaters and terminals over time.

The difference between the baseline loop gain levels and the measured loop gain levels is typically referred to as the loop-back signature. For example, under operating conditions, measured loop gains may be determined for each of the amplifier pairs in the sequence in which the amplifier pairs are encountered along the transmission path. That is, a first data point would represent the loop gain from the LME to the first amplifier pair, and a second data point would represent the gain from the LME to the second amplifier pair, and so on. The difference between the baseline curve and the measured curve is a representation of the loop-back signature.

An ideal signature is a straight horizontal line running through a gain change of 0 dB, indicating that all the loop gain measurements from the amplifier pairs agree exactly with the pre-established baseline. In practice, however, system noise and other transmission variations will normally occur. As a result, a nominal signature will typically have a random shape within some pre-established window about the zero line defining a nominal band of acceptability. Extreme faults, such as fiber breaks and other problems that result in immediate loss of service, will typically result in a signature shape with one or more points of the signature outside of the pre-established window. However, there is a class of other faults and conditions, which typically would not be expected to result in any discernable differences that could be detected by the LME. For instance, the failure of a redundant electrical power supply or a rise in temperature beyond the expected limits in an area housing the optical device in a terrestrial system would not otherwise be detected by the LME until it resulted in some equipment fault.

Accordingly, there is a need for a system and method that overcomes the deficiencies of the prior art and allows for signaling of a variety of faults and conditions for an optical device, such as a repeater, that may otherwise not be detected by the LME.

SUMMARY OF THE INVENTION

An optical device consistent with the invention includes first and second transmission paths, and a loop-back path. The loop-back path couples a portion of an optical signal from the first transmission path to the second transmission path as a loop-back signal, and includes at least one optical attenuator configured to attenuate the loop-back signal in response to at least one detected condition. The loop-back signal may be detected by the LME where the attenuation imparted by the attenuator is interpreted as an indication of one or more detected conditions in a class of conditions associated with the attenuator setting.

A method of monitoring an optical device consistent with the present invention includes detecting a condition in the optical device, attenuating a loop-back signal on a loop-back path in said device in response to the detected condition, and detecting the attenuated loop-back signal.

BRIEF DESCRIPTION OF THE DRAWINGS

For a better understanding of the present invention, together with other objects, features and advantages, reference should be made to the following detailed description which should be read in conjunction with the following figures wherein like numerals represent like parts.

DETAILED DESCRIPTION

Figure 1:
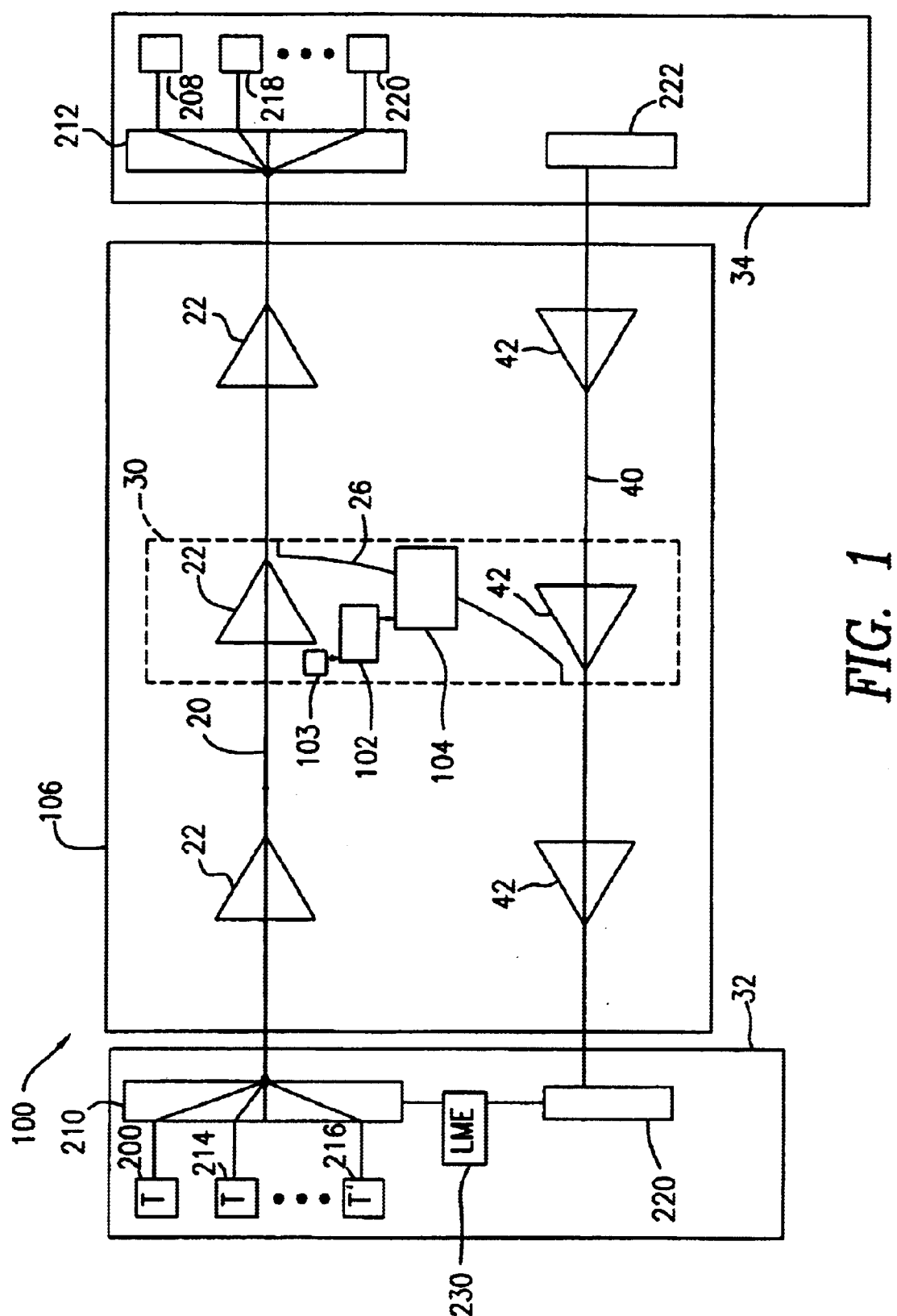
FIG. 1 is a block diagram of an exemplary optical communication system consistent with the present invention.

Turning now to FIG. 1, there is illustrated an exemplary optical communication system 100 consistent with the present invention. Those skilled in the art will recognize that the system 100 has been depicted in a highly simplified form for ease of explanation. It is to be understood that the present invention is not limited to illustrated exemplary embodiments described herein. In fact, the present invention may be incorporated into a wide variety of optical networks, systems and devices without departing from the spirit and scope of the invention.

The optical communication system 100 includes transmitter/receiver terminals 32, 34 connected via an optical information channel 106 supporting bi-directional communication. For clarity, the terminal 32 is generally described and illustrated in FIG. 1 as a transmitting terminal and the terminal 34 is illustrated and generally described as a receiving terminal. Of course, in a bi-directional communication system, both terminals 32, 34 may serve as transmitting and receiving terminals and, as such, each includes both transmitters and receivers and associated multiplexers and demultiplexers. Depending on system characteristics and requirements, the optical information channel 106 may include optical fiber paths 20, 40, optical amplifiers 22, 42, regenerators, optical filters, dispersion compensating modules, and other active and passive components. A variety of configurations for each of these elements will be known to those skilled in the art.

The transmitting terminal 32 includes optical transmitters 200, 214, . . . 216 for transmitting optical communication channels at associated wavelengths, e.g., $\lambda_1$, $\lambda_2$, . . . $\lambda_n$. Multiplexer 210 combines these signals into an aggregate signal that is launched into a first optical fiber path 20 for transmission to the receiving terminal 34. At the receiving terminal 34, demultiplexer 212 demultiplexes the aggregate signal and routes the channel wavelengths, e.g., $\lambda_1$, $\lambda_2$, . . . $\lambda_n$, to receivers 208, 218 . . . 220, respectively. Similarly, the terminal 34 may also include a multiplexer 222 for combining signals into an aggregate signal that is launched into a second optical fiber path 40 for transmission to the demultiplexer 220 in the transmitter/receiver terminal 32.

Optical amplifiers, e.g., 22, 42, may include Raman amplifiers, rare earth doped amplifiers such as an EDFA, or the like. Pairs of optical amplifiers supporting opposite-traveling signals on separate fiber pairs may typically be housed in a single repeater unit 30. The repeaters may be spaced by a number of kilometers, e.g., 50 kilometers or more, depending on system characteristics and requirements. The repeaters may be under water in long-haul submarine applications or in a switching station or the like in terrestrial applications. While only three optical amplifier pairs are illustrated in FIG. 1 for clarity of discussion, those skilled in the art will recognize that any number of optical amplifier pairs may be utilized in varying transmission path lengths.

A loop-back path 26 couples a portion of the optical signal from the first transmission path 20 to the second transmission path 40 to provide a loop-back signal for detection by LME 230. The LME may be located in the first transmitter/receiver terminal 32 and connected to both a demultiplexer 220 that receives signals from the second optical transmission path 40 and multiplexer 210 that transmits signals to the first optical transmission path 20. Similarly, another LME (not shown) may be located in the other transmitter/receiver 34. Generally, although not shown in FIG. 1, each repeater in the transmission system may include such a loop-back path. In addition, though not shown in FIG. 1, each loop-back path may establish a path in both loop-back directions. In other words, the loop-back path 26 may also couple a portion of the optical signal from the second transmission path 40 to the first transmission path 20.

In the illustrated exemplary embodiment, an optical attenuator 104 is coupled to the loop-back path 26 of the repeater 30. A controller 102 is provided for controlling the attenuation level of the attenuator 104 in response to an output from a detector 103 configured to detect a fault or condition. When the condition is present, the controller sets an associated predetermined attenuation level for the attenuator. The predetermined attenuation is detected and interpreted by the LME 230 as corresponding to the detected condition.

Advantageously, the detector 103 may be configured to detect a variety of faults or conditions. For example, the detector 103 may be a temperature sensor. In this configuration, when the ambient temperature in the housing area of the repeater rises to an unacceptably high level, the detector may provide an output to the controller for causing an associated predetermined attenuation level for the attenuator. The attenuation imparted to the loop-back signal in the loop-back path 26 may be detected at the LME 230 to indicate a high temperature condition at the repeater. Knowledge of the high temperature condition may allow correction of the condition prior to repeater failure.

In another example, the detector 103 may be configured to detect an external DC bus failure. Typically, electrical power to repeaters in terrestrial applications is supplied in dual feeds for added reliability. If one feed malfunctions, the other feed supplies the necessary power. When one of the feeds fails, the detector 103 may sense the failure and cause the controller to set the attenuator to a predetermined attenuation level associated with the bus failure. The attenuation-level may be detected at the LME to indicate a bus failure condition at the repeater, enabling repair prior to failure of the alternate feed. Those skilled in the art will recognize other faults or conditions that may be detected such as, but not limited to, internal optical amplifier faults and electrical/optical internal faults.

In addition, faults or conditions may be divided into associated fault categories. Each fault category may trigger the optical attenuator to attenuate to a predetermined attenuation level associated therewith. For example, faults including an internal optical amplifier fault, and an internal electrical/optical fault may be categorized as "internal" faults. Other faults including an external DC bus failure and others may be categorized as "external" faults. The optical attenuator 104 may then be controlled by the controller 102 to attenuate to a first predetermined level for an "internal" fault, and to a second predetermined level for an "external" fault. In this way, certain internal faults will trigger a first predetermined attenuation level that may be detected by the LME 230, and certain external faults will trigger a second predetermined attenuation level that may also be detected by the LME.

Advantageously, the type and quantity of faults to be divided in each fault category may be specified by a particular customer need and may be stored in a non-volatile memory device local to the particular optical device. The maximum and minimum chosen level of attenuation depends on the optical communication system characteristics including the span length, number of repeaters, number of channels, etc. In one example, the maximum level of attenuation is 15 dB because any more attenuation would lead to an undetectable loop-back signal.

Figure 2:
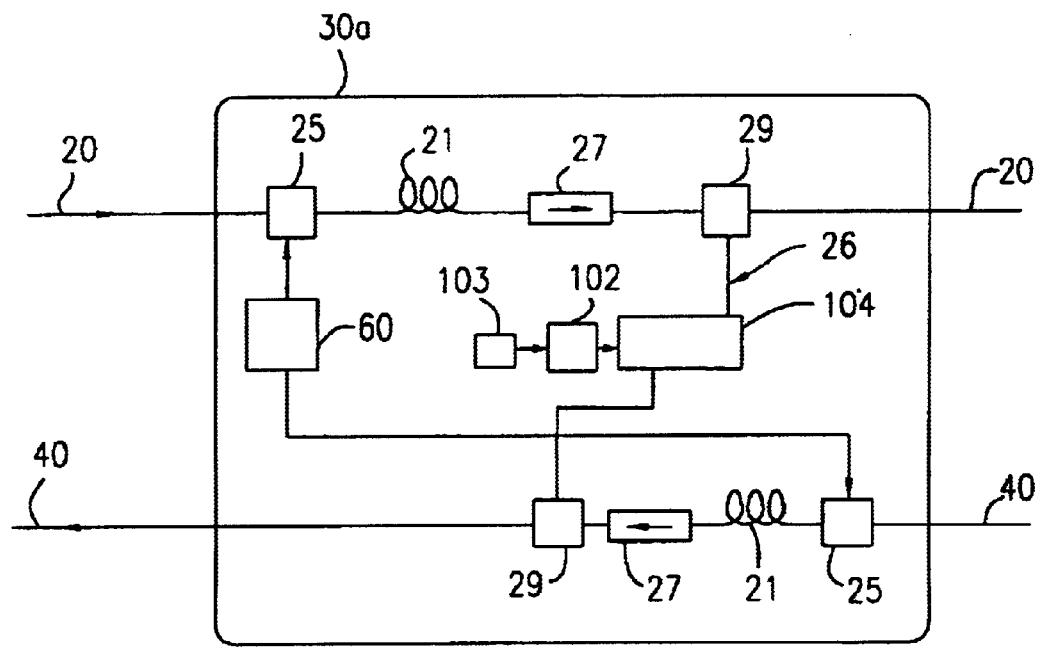
FIG. 2 is a simplified block diagram of an exemplary repeater consistent with the invention.

Turning to FIG. 2, an exemplary repeater 30a consistent with the invention is illustrated in greater detail. As shown, the repeater 30a includes a pair of optical amplifiers. For ease of explanation, the optical amplifiers shown and described in reference to FIG. 2 are rare earth doped fiber amplifiers such as EDFAs. However, other optical amplifiers such as Raman amplifiers may be utilized in an optical device consistent with the present invention.

In the illustrated exemplary embodiment, a pump source 60 is coupled to the first transmission path 20 by coupler 25 for generating gain in a doped fiber section 21. The pump source 60 may also be coupled to the second transmission path 40. For erbium-doped fibers, pump wavelengths of 980 nm or 1480 nm are suitable. The pump source 60 may include one or a plurality of pumps provided in a wide variety of configurations. A number of pump sources are known to those skilled in the art, including, for example, laser pump sources. A variety of couplers 25 for combining the pump energy into each fiber path are also known, e.g., optical couplers or a wavelength division multiplexer. Other configurations are also possible, e.g., the order of the coupler 25 and the doped fiber section 21 may be reversed in some designs. An optical isolator 27 may also be located immediately downstream from each of the doped fibers. The isolator 27 acts as an amplified spontaneous emission (ASE) filter to prevent ASE from traveling back upstream and disrupting system stability. Such ASE typically causes optical amplifiers to oscillate.

At the output of the isolator, another coupler 29 is provided for separating a portion of the total power in the transmitted signal, i.e., a loop-back signal, onto a loop-back path 26. As described above, the loop-back path couples a portion of the optical signal transmitted on path 20 to transmission path 40, or vice-versa, for analysis by the LME 230. The LME may monitor the loop gain, i.e., the cumulative gain on the path through path 20, the loop-back path, and path 40 and back to the LME 230 to ascertain the viability of the elements in the loop. Those skilled in the art will recognize other active and passive components, e.g., various filters such as Fiber Bragg Gratings, that may be utilized in the exemplary repeater 30a without departing from the scope of the present invention.

Advantageously, as described earlier in reference to FIG. 1, an optical attenuator 104 is coupled to the loop-back path 26 for attenuating the loop-back signal to one or more predetermined levels in response to associated faults or conditions. In particular, detector 103 detects a fault condition and causes the controller to set the predetermined attenuation level at the attenuator in response to the condition. The predetermined attenuation level applied to the loop-back signal may be detected and interpreted by the LME 230 as corresponding to the detected fault condition.

Figure 3A:
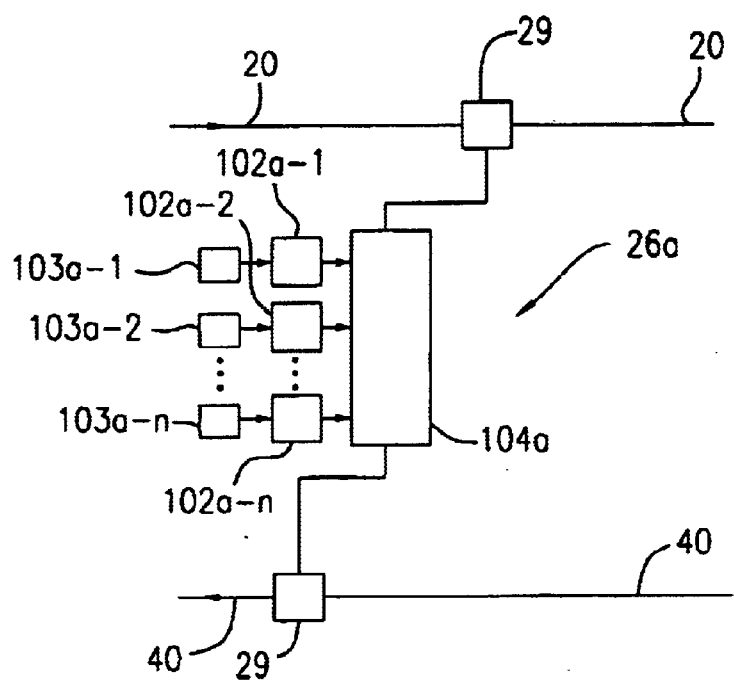
FIG. 3A is a block diagram of an exemplary loop-back path portion of an optical device consistent with the invention.

Attenuation in the loop-back path may be accomplished by a variety of configurations. As shown in FIG. 3A, for example, an exemplary loop-back path 26a may include a plurality of redundant detector and controller pairs 103a-1 and 102a-1, 103a-2 and 102a-2, . . . 103a-n and 102a-n coupled to a single variable optical attenuator 104a. For reliability purposes, groups of the redundant detector and controller pairs may be configured to detect similar fault conditions. In one embodiment, only one fault detector and controller pair is operational, at any one given time, to control the optical attenuator 104a.

Figure 3B:
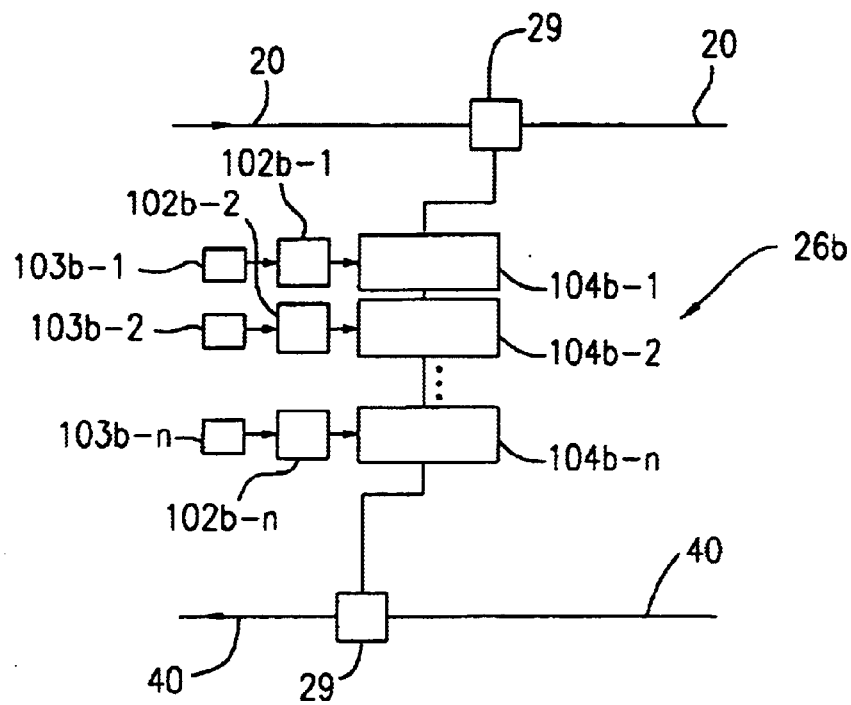
FIG. 3B is a block diagram of another exemplary loop-back path portion of an optical device consistent with the invention.

In another exemplary embodiment 26b, as shown in FIG. 3B, a plurality of redundant detector and controller pairs may be used with a corresponding number of associated optical attenuators 104b-1, 104b-2, . . . 104b-n. This configuration may utilize only one detector and controller pair with one optical attenuator at a time 103b-1, 102b-1, 104b-1 and use the others as backup. Alternatively, this configuration may utilize each detector 103b-1, 103b-2, . . . 103b-n to detect an associated condition, e.g., temperature, external bus voltage, etc. Each associated controller 102b-1, 102b-2, . . . 102b-n may then be responsive to the detected fault conditions to trigger an associated attenuation level in its associated optical attenuator 104b-1, 104b-2, . . . 104b-n.

The optical attenuators in any of the aforementioned embodiments may be variable or fixed attenuators. A variable attenuator may be capable of imparting attenuation in a variety of different attenuation ranges, e.g., over a range of 1.0 dB to 35 dB, while a fixed attenuator attenuates a signal to only a fixed attenuation level. The fixed attenuation level may also be in the 1.0 dB to 35 dB range. In operation, the chosen attenuation level should be great enough such that the resulting loop-back gain signature at the LME is clearly distinguishable from random signature fluctuations about the pre-determined signature band.

Figure 4:
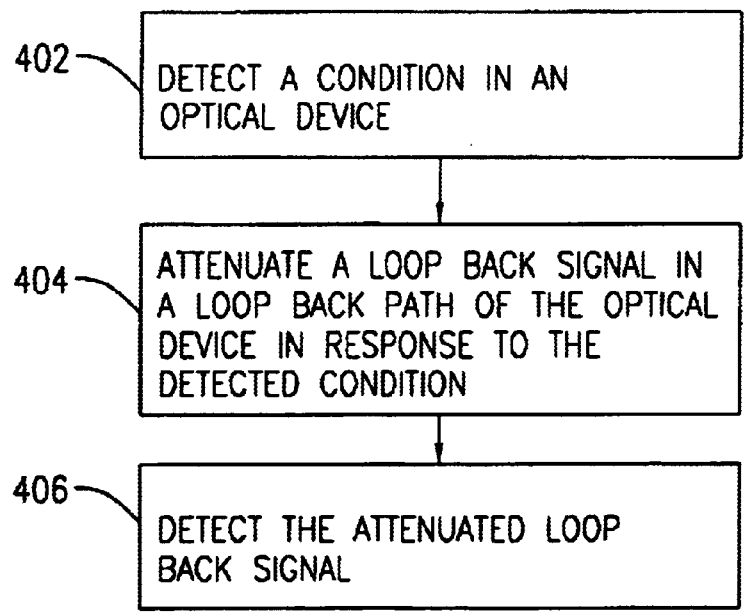
FIG. 4 is a flowchart of steps performed in an exemplary method consistent with the invention.

Turning to FIG. 4, steps of an exemplary method consistent with the present invention are illustrated. As shown, a condition in an optical device, e.g., a repeater including a pair of optical amplifiers, is detected 402. Conditions may include any number of faults or fault conditions as detailed earlier. In response to the detected condition, a predetermined attenuation is imparted 404 to a loop-back signal in a loop-back path of the device to facilitate detection 406 of the condition, e.g., by the LME. This enables more targeted and efficient troubleshooting to take place in an optical communication system. This also enables preventative measures to be taken before faults occur. For example, if a high ambient temperature condition is sensed, equipment failures may be avoided before they otherwise would occur. In addition, the type and quantity of faults or conditions may be specified by a particular customer need. Those skilled in the art will recognize that a method consistent with the present invention may use any number of optical attenuators and each optical attenuator may be a fixed or variable attenuator depending on system requirements.

The embodiments that have been described herein, however, are but some of the several which utilize this invention and are set forth here by way of illustration but not of limitation. It is obvious that many other embodiments, which will be readily apparent to those skilled in the art, may be made without departing materially from the spirit and scope of the invention.

What is claimed is:

1. An optical device comprising:
   first and second optical signal transmission paths;
   at least one detector configured to provide a detector output in response to at least one detected condition; and
   a loop-back path for coupling a portion of an optical signal from said first transmission path to said second transmission path as a loop-back signal, said loop-back path comprising at least one optical attenuator configured to attenuate said loop-back signal in response to said detector output.

2. The optical device of claim 1, wherein said device comprises a plurality of said optical attenuators, each of said attenuators being configured to attenuate said loop-back signal at an associated attenuation level in response to an associated one of said detected conditions.

3. The optical device of claim 1, wherein said device comprises a plurality of said optical attenuators, each of said attenuators being configured to attenuate said loop-back signal at an associated attenuation level in response to an associated category of said detected conditions.

4. The optical device of claim 1, wherein said at least one optical attenuator is configured to attenuate said loop-back signal at a plurality of attenuations levels, each of said attenuation levels being associated with a different one of said detected conditions.

5. The optical device of claim 1, wherein said at least one optical attenuator is configured to attenuate said loop-back signal at a plurality of attenuations levels, each of said attenuation levels being associated with a different category of said detected conditions.

6. An optical device comprising:
first and second optical signal transmission paths; and
a loop-back path for coupling a portion of an optical signal from said first transmission path to said second transmission path as a loop-back signal, said loop-back path comprising at least one optical attenuator configured to attenuate said loop-back signal in response to at least one high ambient temperature condition.

7. The optical device of claim 1, wherein said loop-back path further comprises at least one controller configured to provide at least one control signal in response to said detected condition, and wherein an attenuation level of said at least one attenuator is established in response to said control signal.

8. The optical device of claim 1, wherein said optical attenuator is a variable attenuator.

9. The optical device of claim 1, wherein said optical attenuator is a fixed attenuator.

10. An optical communication system comprising:
a transmitter configured to transmit an optical signal over an optical information channel, said optical information channel comprising first and second optical signal transmission paths; at least one detector configured to provide a detector output in response to at least one detected condition; and a loop-back path for coupling a portion of an optical signal from said first transmission path to said second transmission path as a loop-back signal, said loop-back path comprising at least one optical attenuator configured to attenuate said loop-back signal in response to said detector output; and
a line monitoring system configured to detect said loop-back signal.

11. The system of claim 10, wherein said device comprises a plurality of said optical attenuators, each of said attenuators being configured to attenuate said loop-back signal at an associated attenuation level in response to an associated one of said detected conditions.

12. The system of claim 10, wherein said device comprises a plurality of said optical attenuators, each of said attenuators being configured to attenuate said loop-back signal at an associated attenuation level in response to an associated category of said detected conditions.

13. The system of claim 10, wherein said at least one optical attenuator is configured to attenuate said loop-back signal at a plurality of attenuations levels, each of said attenuation levels being associated with a different one of said detected conditions.

14. The system of claim 10, wherein said at least one optical attenuator is configured to attenuate said loop-back signal at a plurality of attenuations levels, each of said attenuation levels being associated with a different category of said detected conditions.

15. An optical communication system comprising:
a transmitter configured to transmit an optical signal over an optical information channel, said optical information channel comprising first and second optical signal transmission paths and a loop-back path for coupling a portion of an optical signal from said first transmission path to said second transmission path as a loop-back signal, said loop-back path comprising at least one optical attenuator configured to attenuate said loop-back signal in response to at least one high ambient temperature condition; and
a line monitoring system configured to detect said loop-back signal.

16. The system of claim 10, wherein said loop-back path further comprises at least one controller configured to provide at least one control signal in response to said detected condition, and wherein an attenuation level of said at least one attenuator is established in response to said control signal.

17. The system of claim 10, wherein said optical attenuator is a variable attenuator.

18. The system of claim 10, wherein said optical attenuator is a fixed attenuator.

19. A method of monitoring an optical device comprising:
detecting a condition in said optical device;
attenuating a loop-back signal on a loop-back path in said device in response to said detected condition; and
detecting said attenuated loop-back signal.

20. The method of claim 19, wherein said attenuating step comprises attenuating said loop-back signal to a predetermined level associated with said detected condition.

21. The method of claim 19, wherein said detecting step comprises detecting a plurality of said conditions, and wherein said attenuating step comprises attenuating said loop-back signal to a predetermined level associated with each of said detected conditions.

22. A method of monitoring an optical device comprising:
detecting a high ambient temperature condition in said optical device:
attenuating a loop-back signal on a loop-back path in said device in response to said detected condition; and
detecting said attenuated loop-back signal.

23. The optical device of claim 1, wherein said detected condition is a high ambient temperature condition.

24. The system of claim 10, wherein said detected condition is a high ambient temperature condition.

* * * * *